(12) United States Patent
Holland et al.

(10) Patent No.: US 8,916,011 B2
(45) Date of Patent: Dec. 23, 2014

(54) FIRESHIELD FASTENER HOOD

(75) Inventors: Brian Kenneth Holland, Lansing, MI (US); William Bogue, Hebron, CT (US)

(73) Assignee: United Technologies Corporation, Hartford, CT (US)

(*) Notice: Subject to any disclaimer, the term of this patent is extended or adjusted under 35 U.S.C. 154(b) by 300 days.

(21) Appl. No.: 13/168,195

(22) Filed: Jun. 24, 2011

(65) Prior Publication Data
US 2012/0328427 A1  Dec. 27, 2012

(51) Int. Cl.
*B32B 43/00* (2006.01)
*A61F 13/15* (2006.01)
*B29C 65/00* (2006.01)
*B32B 37/00* (2006.01)
*B32B 38/04* (2006.01)
*C09J 7/02* (2006.01)
*F01D 5/08* (2006.01)
*F01D 5/18* (2006.01)
*F01D 25/08* (2006.01)
*F04D 29/58* (2006.01)
*F16B 37/14* (2006.01)
*A47G 3/00* (2006.01)
*B64F 5/00* (2006.01)
*B64D 29/00* (2006.01)

(52) U.S. Cl.
CPC .............. *B64F 5/0081* (2013.01); *F16B 37/14* (2013.01); *B64D 29/00* (2013.01)
USPC ............ 156/98; 156/227; 156/250; 156/293; 156/329; 415/177; 411/372.6; 411/373

(58) Field of Classification Search
CPC ........ F16B 37/14; F16B 41/00; F16B 41/002; F16B 41/005; B29C 73/00; B29C 73/04; B29C 73/10; A47G 3/00

USPC ............ 156/60, 71, 91, 92, 94, 98, 196, 211, 156/212, 213, 214, 227, 250, 256, 267, 293, 156/303.1, 325, 326, 327, 329; 60/39.34, 60/39.35; 415/170.1, 177; 416/95, 224; 411/372.5, 372.6, 373, 375, 376
See application file for complete search history.

(56) References Cited

U.S. PATENT DOCUMENTS

| | | | |
|---|---|---|---|
| 4,322,945 A | 4/1982 | Peterson et al. | |
| 5,226,788 A | 7/1993 | Fledderjohn | |
| 5,399,066 A | 3/1995 | Ritchie et al. | |
| 5,464,227 A | 11/1995 | Olson | |
| 5,509,270 A | 4/1996 | Pearce et al. | |
| 5,622,438 A | 4/1997 | Walsh et al. | |
| 5,664,810 A * | 9/1997 | Zielinski | 285/152.1 |
| 6,076,356 A | 6/2000 | Pelletier | |
| 6,196,790 B1 | 3/2001 | Sheridan et al. | |
| 6,276,141 B1 * | 8/2001 | Pelletier | 60/740 |
| 6,720,087 B2 | 4/2004 | Fried et al. | |
| 6,758,045 B2 | 7/2004 | Dimov et al. | |
| 7,140,185 B2 | 11/2006 | Burd | |
| 2010/0021268 A1 * | 1/2010 | Dean et al. | 411/542 |
| 2011/0151184 A1 * | 6/2011 | Jundt et al. | 428/138 |

* cited by examiner

OTHER PUBLICATIONS

DAPCO 18-4 Product Description. Western American Specialties. http://www.westernamspec.com/products/adhesive/dapco-18-4/39852.*

*Primary Examiner* — Philip Tucker
*Assistant Examiner* — Brian R Slawski
(74) *Attorney, Agent, or Firm* — Carlson, Gaskey & Olds P.C

(57) ABSTRACT

A fireshield fastener hood and method of bonding a cover to a substrate therefor.

17 Claims, 5 Drawing Sheets

- 100 — CLEAN A REPAIR AREA OF A SUBSTRATE.
- 102 — TRIM OFF A TAB FROM THE SUBSTRATE.
- 104 — FORM THE COVER TO MATCH THE CONTOUR OF A SUBSTRATE. LEAVE ENOUGH TO FOR THE NEW TAB. THE COVER SHOULD OVERLAY THE CONTOURED HOOD AND PLATFORM OF THE SUBSTRATE.
- 106 — VISUALLY INSPECT THE COVER. FOLDS AND WRINKLES ARE PERMITTED, BUT THE COVER MUST NOT HAVE ANY CRACKS OR TEARS.
- 108 — TRIM THE COVER TO COVER THE ENTIRE HOOD EXCEPT THE HINGE. TRIM COVER EXCEPT AT THE HINGE AND TAB.
- 110 — CLEAN THE COVER.
- 112 — APPLY A THIN LAYER OF PRIMER TO MATING SURFACES OF THE HOOD AND FOIL PATCH.
- 114 — APPLY A THIN LAYER OF THE SEALANT TO THE MATING SURFACES OF THE HOOD AND COVER.
- 116 — PRESS THE COVER TO THE SUBSTRATE. PERMISSABLR TO DART THE COVER AT THE EDGES OF THE SUBSTRATE HOOD BEFORE THE EDGES ARE FOLDED OVER. SEALANT SQUEEZE OUT IS REQUIRED ALL AROUND THE SUBSTRATE EDGE.
- 118 — REMOVE EXCESS SEALANT FROM THE REPAIR AREA BEFORE CURING CYCLE IS COMPLETED.
- 120 — EDGE SEAL THE COVER THAT THE PERIMETER BETWEEN THE HOOD AND COVER IS FULLY ENCAPSULATED.
- 122 — CURE SEALANT.
- 124 — INSPECT THE COVER FOR SEALING.
- 126 — ENGAGE THE TAB WITH THE RETAINER.

FIRESHIELD FASTENER HOOD

BACKGROUND

The present disclosure relates to a fireshield, and more particularly to an aircraft nacelle fireshield.

Fireshields often line sections of gas turbine engine nacelle structures such as thrust reverse sections to provide thermal protection. Fireshields are subject to high temperatures and eventually may require replacement.

Fireseal fastener hoods are welded thermal protection covers for fasteners and fastener holes by which the fireshield is attached to engine nacelle structure. Fireseal fastener hoods typically extend outward from the fireshield and may be particular susceptible to handling damage which in turn may necessitate replacement of the entire fireshield because welding a replacement hood may damage an underlying substrate.

SUMMARY

A method of repairing a fireshield fastener hood according to an exemplary aspect of the present disclosure includes bonding a cover to a substrate.

A fireshield fastener hood according to an exemplary aspect of the present disclosure includes a cover bonded to a substrate.

A fireshield according to an exemplary aspect of the present disclosure includes a fireshield fastener hood welded to a fireshield at a hinge, the fireshield fastener hood includes a cover bonded to a substrate.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 8 is a method of repair steps for the fireshield fastener hood;

DETAILED DESCRIPTION

Figure 1:
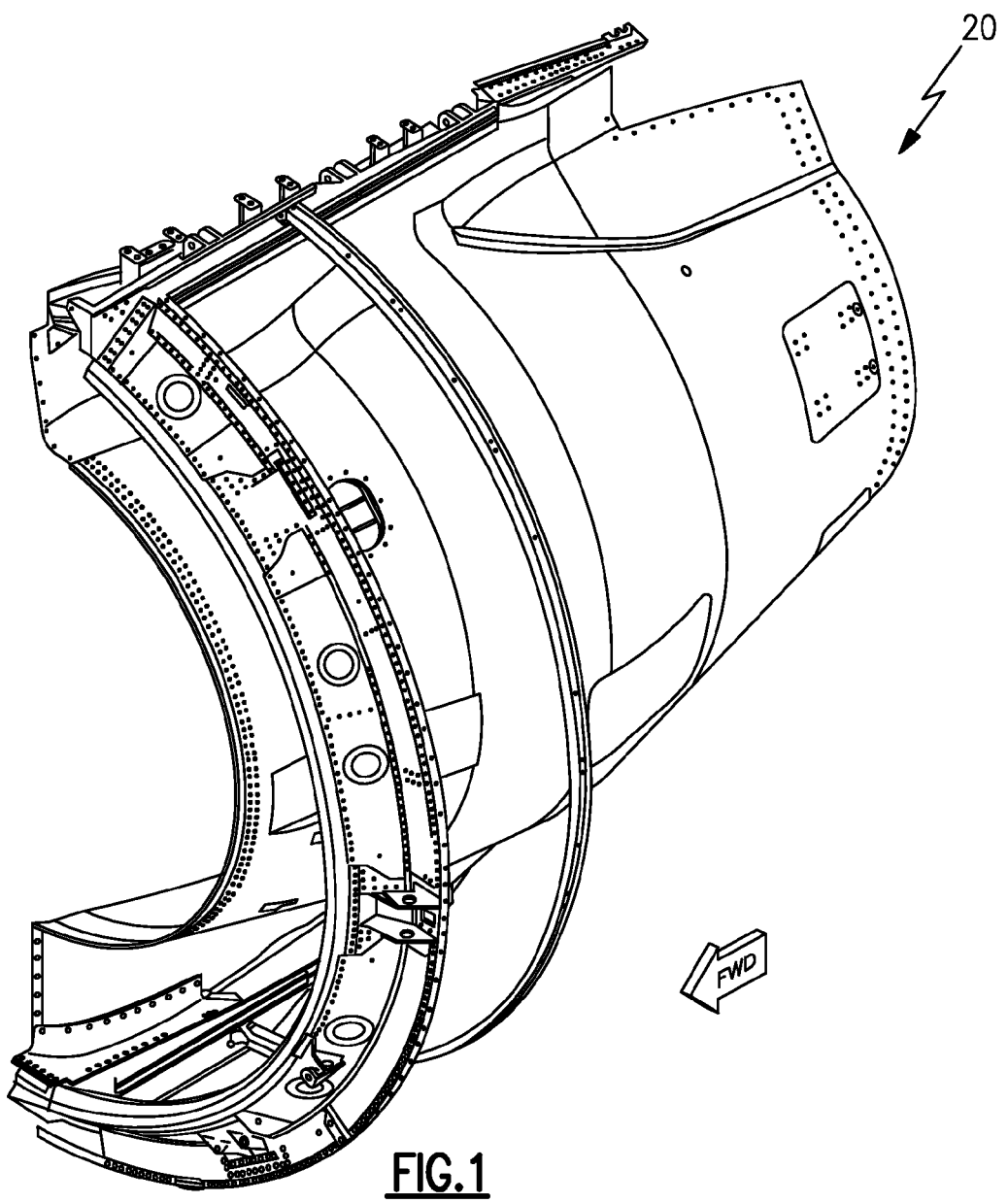
FIG. 1 is a general perspective view of part of a nacelle structure for a gas turbine engine embodiment for use with the present disclosure.

FIG. 1 illustrates a Thrust Reverser Core Cowl portion of a gas turbine engine nacelle structure 20. Although a nacelle structure 20 is illustrated in the disclosed non-limiting embodiment, it should be understood that various structures will benefit herefrom and the disclosure herein should not be limited only to such structures.

Figure 2:
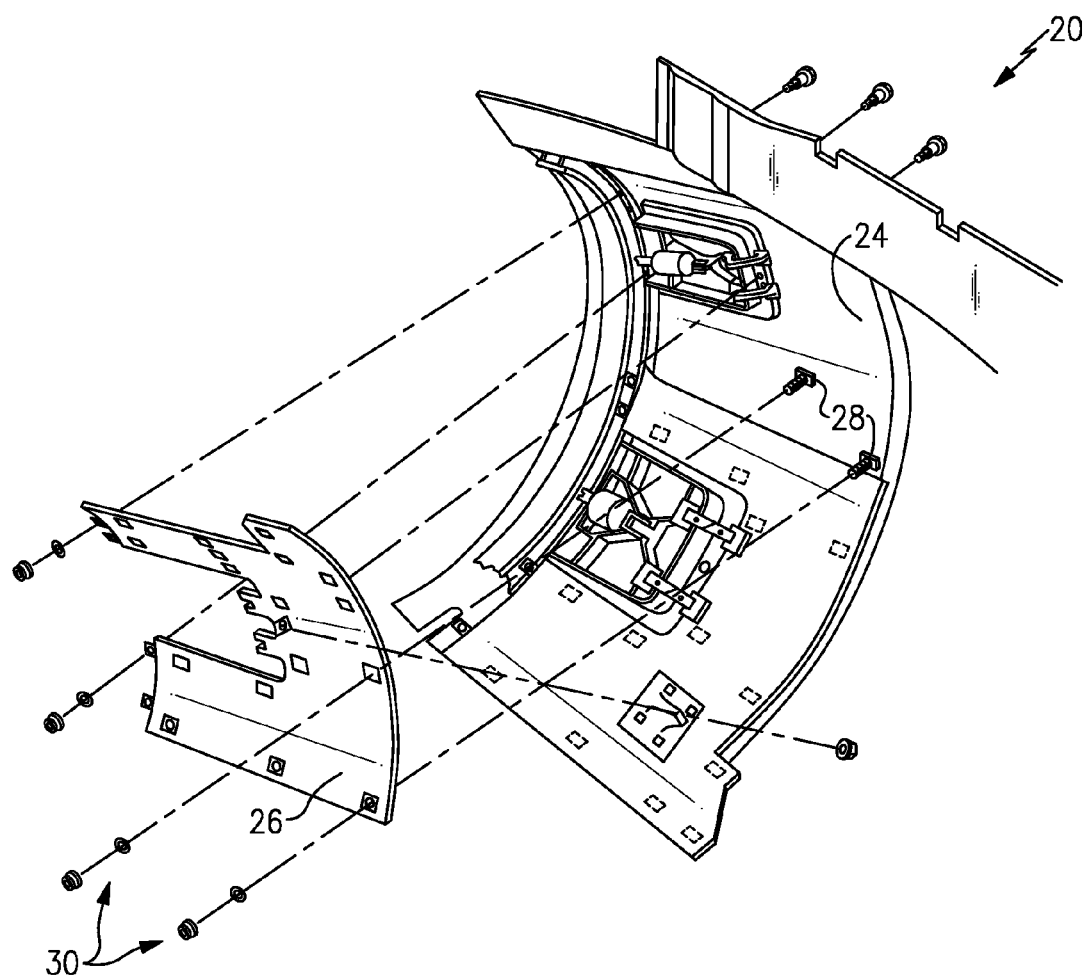
FIG. 2 is an exploded view of a fireshield of the nacelle structure of FIG. 1.

With reference to FIG. 2, the nacelle structure 20 generally includes an inner cowl section 24 onto which is mounted a fireshield 26. The cowl section 24 is typically manufactured from a carbon fiber or light weight metallic material such as an aluminum alloy which may require the thermal protection of the fireshield 26 during normal service or in the abnormal event of a fire in that compartment.

Figure 3:
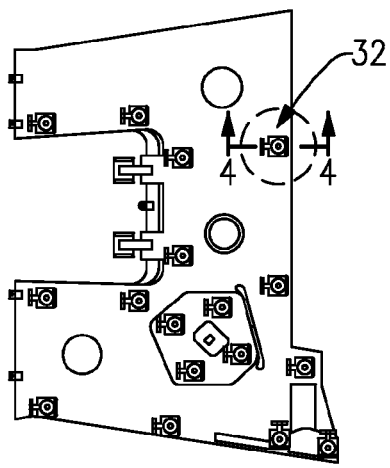
FIG. 3 is an inner view of the fireshield illustrating a fireshield fastener hood

The fireshield 26 is mounted to a multiple of studs 28 which extend from the cowl section 24. The studs 28 extend through the fireshield 26 to receive a fastener 30 such as a nut to retain the fireshield 26 to the cowl section 24. The extended stud 28 and fastener 30 are protected by a movable fireshield fastener hood 32 (FIG. 3). Although a movable fireshield hood for a fastener is discussed in detail herein, it should be understood that other fireshield hoods such as that for a hinge 34 will also benefit herefrom.

Figure 4:
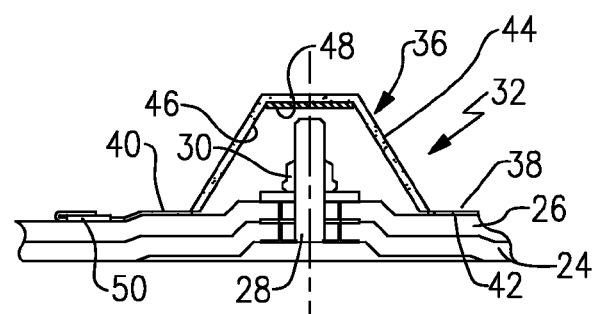
FIG. 4 is a sectional view of the fireshield fastener hood attached to a fireshield mounted to the nacelle cowl.
Figure 5:
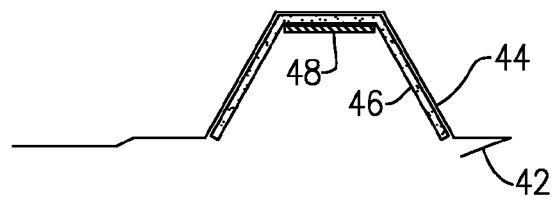
FIG. 5 is a sectional view of the fireshield fastener hood.

With reference to FIG. 4, the fireshield fastener hood 32 generally includes a frustro-conical hood 36 which extends from a generally planar platform 38 which includes a tab 40 and a bendable hinge 42 (also illustrated in FIG. 5). The hood 36, platform 38, tab 40 and hinge 42 may be manufactured of an AISI 300 Series Stainless Steel alloy substrate 44 which is approximately 0.003 inches (0.0762 mm) thick. A silicone layer 46 coats the interior of the hood 36 and a polytetrafluoroethylene disk 48 is mounted to the apex of the hood 36 to protect the silicone layer 46 should the relatively thin substrate 44 be over-compressed to make intimate contact with the stud 28. It should be understood that various other constructions may alternatively or additionally be provided and the fireshield fastener hood 32 may be of various geometries.

The hinge 42 is a folded section of the substrate 44 which may be tack welded to the fireshield 26 to permit the fireshield fastener hood 32 to move relative thereto. The tab 40 extends from the platform 38 for receipt into a retainer 50 in the fireshield 26 to close the fireshield fastener hood 32 over the stud 28 and fastener 30. To access the stud 28 and fastener 30, the tab 40 is slipped out from under the retainer 50 and the fireshield fastener hood 32 is pivoted upon the hinge 42.

Figure 6:
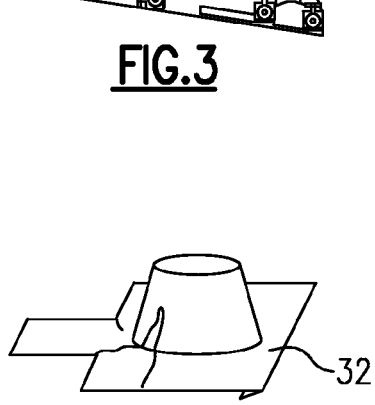
FIG. 6 is a perspective view of the fireshield fastener hood.
Figure 7:
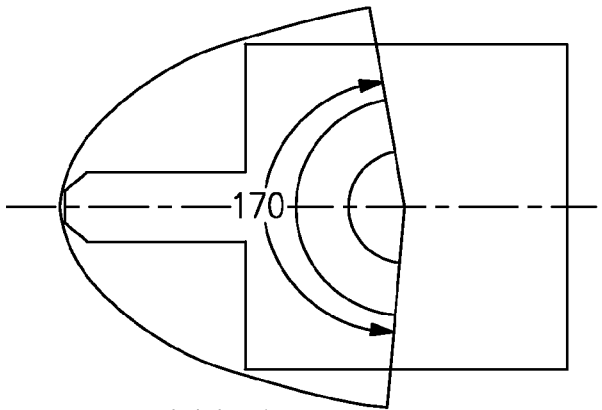
FIG. 7 is a schematic view of an allowable crack area in the fireshield fastener hood for a repair thereof.

Oftentimes the substrate 44 may crack, tear, or otherwise be damaged in a manner which is repairable by the method disclosed herein (FIG. 6). Typically, acceptable cracks may be located in an arc of approximately 170 degrees from the center of the hood 36 in an area adjacent to the tab 40 (FIG. 7). It should be understood that other crack locations may alternatively or additionally be allowable.

With Reference to FIG. 8, step 100 of a manufacture or repair to the fireshield fastener hood 32 includes cleaning the repair area of the fireshield fastener hood 32. The cleaning facilitates bonding and crack inspection. The repair to the fireshield fastener hood 32 may be performed while the fireshield fastener hood 32 is mounted to the fireshield 26 (FIG. 3).

Figure 9:
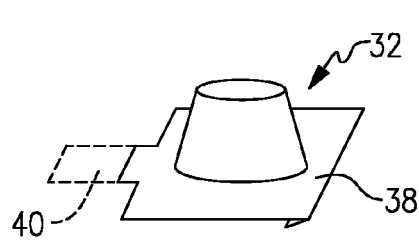
FIG. 9 is a perspective view of the fireshield fastener hood with a tab cut off.
Figure 10:
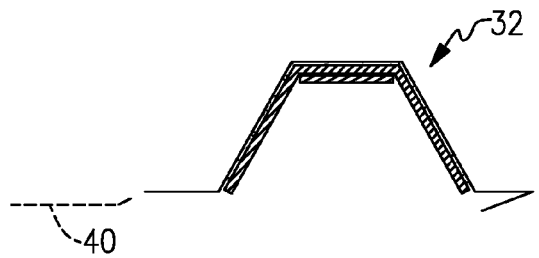
FIG. 10 is a sectional view of the fireshield fastener hood with the tab cut off.

Step 102 of the repair may include removal of the tab 40 (FIGS. 9 and 10). The tab 40 may be trimmed to be from 0 to 0.3 inches (0-8 mm) from the platform 38. The tab removal may only be necessary where an extra thick tab 40 will not fit under retainer 50 or when tab 40 is damaged.

Figure 11:
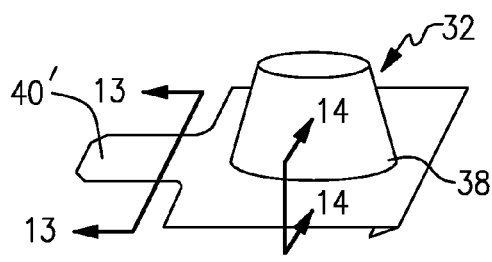
FIG. 11 is a perspective view of the fireshield fastener hood with a cover mounted thereon.

With Reference to FIG. 11, a cover 52 is formed to match the contour of the substrate 44, hood 36 and platform 38 (Step 104). The cover 52 may be formed over a rigid tool which is generally of the contour of the hood 36 and the platform 38. It should be understood that a kit to perform the repair may include a preformed cover 52. The cover 52 should cover the entire contoured hood surface with sufficient material to allow trim. Folds and wrinkles are permitted, but the cover 52 must not have any cracks or tears.

Figure 12:
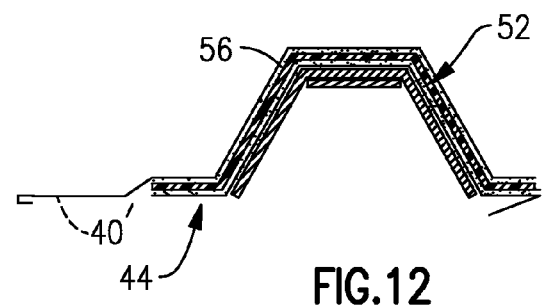
FIG. 12 is a sectional view of the fireshield fastener hood with a cover mounted thereon.
Figure 13:
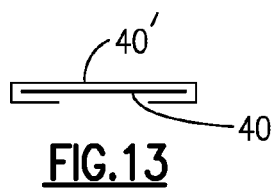
FIG. 13 is a sectional view of a replacement tab taken along line 13-13 in FIG. 11.

The cover 52 may be manufactured of an AISI 300 Series Stainless Steel alloy which is approximately the same thickness as the hood 32. That is, the cover 52 may be manufactured from a similar material as the substrate 44. The cover 52 may also form a replacement tab 40'. That is, the cover 52 forms a double layer of material over the hood 36 and the platform 38 but a single layer to define the replacement tab 40' as only a single layer thickness would fit within the retainer 50 (FIG. 12). The section of the cover 52 which forms the replacement tab 40' should be doubled over a minimum of 0.08 inches (2 mm) along the length of the replacement tab 40 to increase the strength to the replacement tab 40' (FIG. 13).

Figure 14:
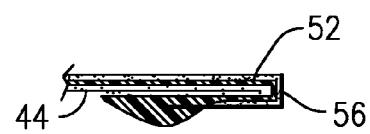
FIG. 14 is an edge view of the fireshield fastener hood with a cover along line 14-14 in FIG. 11.

Step 108 of the repair includes trimming the cover 52 to cover the substrate except the hinge 42. The trimming should include additional material to wrap around the edges. (FIG. 14). The cover 52 may be a maximum of 0.060 inches (10 mm) of the edge (FIG. 14). It is permissible to trim the replacement tab 40' of the cover 52 to width and length after bonding.

In step 110 the cover 52 is cleaned.

In step 112, a layer of primer 54 is applied to the mating surface of the cover 52, and the substrate 44. The primer 54 may be a silicone primer compatible with the fire wall sealant 56, such as DAPCO 1-100 manufactured by D Aircraft Products Inc. of California, USA.

With reference to FIG. 12, in step 114, a layer of sealant 56 is applied to the mating surface of the cover 52, and the substrate 44. The sealant 56 may be a thixotropic silicone paste firewall sealant such as DAPCO 18-4F manufactured by D Aircraft Products Inc. of California, USA.

Figure 15:
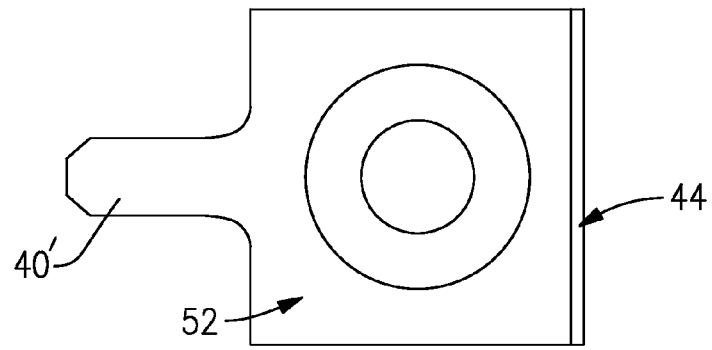
FIG. 15 is a top view of the fireshield fastener hood with the cover.

In step 116, the cover 52 is then pressed onto the layer of sealant 56 on the substrate 44. The cover 52 is wrapped over the edges of the substrate 44 (FIG. 14). It is permissible to dart the cover 52 at the edges where the cover 52 extends beyond the hood 36 before the edges are folded over the platform 38. A Radius of 0.06-0.25 inches (1.5-6.35 mm) may be formed between the platform 38 and the replacement tab 40' (FIG. 15). The radius also minimizes stress concentrations.

In step 118, excess sealant is removed before curing cycle (Step 122).

In step 120, the cover 52 is edge sealed (step 120). Sealant squeeze out is required all around the cover 52 (FIG. 14). The cover 52 is wrapped around the edge to a minimum of 0.2 inches (5 mm) and edge sealed in the sealant 56 (FIG. 14). The perimeter is to be fully encapsulated.

In step 122, the sealant 56 is cured.

In step 124, the cover 52 is inspected for complete sealing and attachment.

In step 126, the replacement tab 40' is inserted into the retainer 50 (FIG. 3).

The repair method covers the damaged area with a new thermal barrier cover 52 bonded with the sealant 56. The method allows for large scale production or repair.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of repairing a fireshield fastener hood comprising:
cutting off at least a portion of a tab from a damaged substrate such that at least the portion of the tab becomes completely detached from the remainder of the substrate; bonding a cover to the substrate with a sealant; forming a replacement tab with the cover; and forming a radius with the cover between a platform of the substrate and the replacement tab.

2. The method as recited in claim 1, further comprising forming the cover to surround a frustro-conical hood of the substrate.

3. The method as recited in claim 1, further comprising forming the cover to match a contour of a frustro-conical hood and a planar platform of the substrate.

4. The method as recited in claim 1, wherein the cover is formed from an AISI 300 series stainless steel alloy foil.

5. A method of repairing a fireshield fastener hood comprising:
cutting off at least a portion of a tab from a damaged substrate such that at least the portion of the tab becomes completely detached from the remainder of the substrate; bonding a cover to the substrate with a sealant; and forming a replacement tab with the cover; and doubling over a section of the cover forming the replacement tab.

6. The method as recited in claim 5, further comprising doubling over a section of the cover forming the replacement tab.

7. The method as recited in claim 6, further comprising forming the cover to match a contour of a frustro-conical hood and a planar platform of the substrate.

8. The method as recited in claim 7, further comprising forming a radius with the cover between a platform of the substrate and the replacement tab.

9. The method as recited in claim 1, wherein the bonding step utilizes thixotropic silicone paste firewall sealant.

10. The method as recited in claim 1, further comprising forming the cover to surround a frustro-conical hood of the substrate.

11. The method as recited in claim 1, further comprising forming the cover to match a contour of a frustro-conical hood and a planar platform of the substrate.

12. The method as recited in claim 1, wherein at least a portion of the fireshield fastener hood remains in place after the fireshield fastener hood is repaired.

13. The method as recited in claim 1, wherein the substrate is formed from a foil.

14. The method as recited in claim 1, wherein the cover includes a frusto-conical shape.

15. The method as recited in claim 14, including providing the cover over a hood of the substrate, the hood having a frusto-conical shape.

16. The method as recited in claim 1, wherein the substrate includes one of a crack and a tear.

17. The method as recited in claim 1, wherein the cover and the substrate are provided by separate pieces of material.

\* \* \* \* \*